2,877,145

COATING

Charles A. Baer, Needham, and Philip J. Clough, Reading, Mass., assignors to National Research Corporation, Cambridge, Mass., a corporation of Massachusetts No Drawing. Application February 13, 1956
Serial No. 564,888

6 Claims. (Cl. 117—227)

This invention relates to coating and more particularly to decorative and functional coatings of zinc formed by vacuum vapor-deposition techniques.

Zinc has long been used as a coating metal in the manufacture of functional coatings such as electrical condensers and the like by vaporization of zinc in an evacuated chamber and subsequent deposition of the zinc vapors on lacquered condenser tissue. Such coatings have usually been preceded by a "seeding" operation wherein a very small percentage of silver was predeposited on the condenser tissue. The exact function of this silver "preseeding" has never been adequately explained, although the "seeding" appeared to improve the continuity and the appearance of the deposited zinc film. However, even with silver "preseeding," zinc coatings have often exhibited a general rather grayish appearance and have often been neither particularly adherent nor particularly resistant to atmospheric corrosion.

The present invention is directed to an effort to provide a process for coating a substrate with zinc vapors under conditions such that the resultant product is very shiny, is resistant to fingerprinting, has excellent adherence, and has a diffuse reflectance of less than 3 percent, although it has a total reflectance on the order of 80 percent. Such a coating can be produced by the present invention on any smooth substrate, metallic or nonmetallic, which does not outgas under the coating conditions. The resultant coating has wide utility from the standpoint of both functional and decorative coatings. It can also be employed in the production of capacitors and in other electrical applications where a tenacious, low-resistance coating is desired. Equally, it can be employed widely in the decorative field where moderate resistance to atmospheric corrosion is essential and where high specular reflectance is desired for optical effects.

Accordingly, it is a principal object of the present invention to provide a novel process for producing a novel zinc-coated product having greatly enhanced physical and optical properties.

Still another object of the invention is to provide a zinc-coated substrate having wide uses for decorative purposes.

Other objects of the invention will in part be obvious and will in part appear hereinafter.

The invention accordingly comprises the process involving the several steps and the relation and the order of one or more of such steps with respect to each of the others and the product possessing the features, properties and relation of components which are exemplified in the following detailed disclosure, and the scope of the application of which will be indicated in the claims.

For a fuller understanding of the nature and objects of the invention, reference should be had to the following detailed description.

In the present invention, a smooth substrate such as, for example, the polyethylene terephthalate sold under the trade name "Mylar" is coated with zinc in an evacuated chamber by evaporating zinc from a molten pool thereof. In practicing the invention, the zinc in the molten pool is maintained at a temperature well above 600° C. and preferably above 700° C. so as to provide high-temperature, high-energy zinc vapors which can strike the substrate with sufficient energy to form what is believed to be an equiaxed crystalline structure, as distinguished from the normal, somewhat powdery deposit obtained by the use of lower-temperature zinc vapors. While the exact reasons for the superiority of the product produced by the present invention are not completely understood, it is believed that the product is fundamentally different from the prior art. It has a considerably higher apparent density, its specular reflectance is much higher, and its adherence is excellent. These physical characteristics are indicative of an equiaxed crystalline structure with an almost continuous zinc film. The high density and continuity of the film are believed to provide a considerably lower surface-to-volume ratio, thereby imparting to the film enhanced resistance to atmospheric corrosion compared to films shown in the prior art which are composed of powdery, grayish deposits.

In a preferred embodiment of the invention, the zinc in the molten pool contains an appreciable amount (e. g., a few percent) of tin. The exact function of the tin is not completely understood. It appears to increase the wetting of the iron crucible when one is employed. If this is actually the case, the end result would be an increase in the energy of the vapor, since increased wetting would increase heat transfer which would, in turn, lead to an increase in the vapor energy. Also, the tin may act to lower the surface tension of the molten zinc, again leading to an increase in the energy content of the zinc vapors. Whatever its function, the tin has a decidedly beneficial effect upon the final product and is directly associated with the low diffuse reflectance of the coating.

The improved results obtained in the present invention are illustrated in the following description of specific non-limiting embodiments of the invention.

*Example I*

A small iron crucible was placed in an induction coil in a vacuum coater of the general type illustrated in U. S. Patent 2,643,201. 250 grams of zinc, about 5 grams of tin and a thermocouple were placed in the iron crucible. A roll of polyethylene terephthalate was positioned in the vacuum chamber and arranged to pass over the crucible at a distance of about 10 inches. The system was then pumped down to a total pressure of about 1 micron Hg abs. and the zinc was heated to a temperature of 480° C. while the substrate was shielded from the zinc vapors. The shield was then moved away and the substrate was moved past the crucible allowing the zinc to deposit. The resultant coating, which had a resistance of about 1.26 ohms per square, was very hazy, fingerprinted very readily and had poor adherence.

*Example II*

The conditions of operation were identical to those of Example I, except that the temperature of the molten zinc was 530° C. The resultant coating was still hazy but the reflectance was somewhat improved. However, the coating had poor adherence and fingerprinted badly.

*Example III*

The conditions were the same as in Example I, except that the zinc was evaporated at 600° C. The coating was considerably improved, being only slightly hazy, having fair adherence, and being more resistant to fingerprinting. Also, this coating had a slight content of tin as shown by spectrographic measurements.

*Example IV*

The conditions were the same as those of Example I, except that the temperature of the zinc was raised to 720° C. At this temperature the product exhibited essentially no haziness or fingerprinting and the adherence was excellent. Similar results were obtained when the zinc temperature was raised to 800° C. The coatings deposited at zinc vapor temperatures in excess of 700° C. contained an appreciable amount of tin (on the order of 1 percent or more).

Since certain changes may be made in the above process and product without departing from the scope of the invention herein contained, it is intended that all matter contained in the above description shall be interpreted as illustrative and not in a limiting sense.

What is claimed is:

1. In the process of coating a substrate with zinc by vacuum deposition techniques, the improvement which comprises maintaining a supply of molten zinc at a temperature above about 700° C. in an evacuated coating chamber to provide high-energy zinc vapors therefrom while moving said substrate past the supply of molten zinc at a speed to give a zinc coating having a resistance between about 0.5 and 5 ohms per square.

2. The process of claim 1 wherein the substrate comprises an organic material and the resultant zinc coating has a total reflectance of about 82 percent and a diffuse reflectance of less than 2 percent at 540 millimicrons, has excellent adherence, being less than about 5 millionths of an inch thick as measured interferemetrically, and exhibits a higher optical density-electrical resistance ratio as compared to hazy zinc coatings.

3. In a process for coating a substrate with zinc by vapor deposition in a vacuum, the improvement which comprises maintaining the molten pool of zinc constituting the vapor source at a temperature in excess of 600° C.

4. The process of claim 3 wherein the molten zinc is maintained at a temperature in excess of 700° C.

5. The process of claim 3 wherein the molten zinc contains at least 1 percent tin.

6. The process of claim 3 wherein the molten metal is contained in an iron container, said molten metal having added thereto a few percent of tin to increase the wetting of the container by the zinc and to lower the surface tension of the zinc, the zinc being heated to a temperature in excess of 600° C. during coating.

References Cited in the file of this patent

UNITED STATES PATENTS

| | | |
|---|---|---|
| 2,382,432 | McManus et al. | Aug. 14, 1945 |
| 2,615,955 | McLean | Oct. 28, 1952 |
| 2,702,760 | Barth | Feb. 22, 1955 |
| 2,709,663 | McLean et al. | May 31, 1955 |
| 2,726,179 | Ortlieb et al. | Dec. 6, 1955 |
| 2,740,732 | Peck et al. | Apr. 3, 1956 |